United States Patent [19]
Hughes

[11] Patent Number: 5,264,064
[45] Date of Patent: Nov. 23, 1993

[54] METHOD AND SYSTEM FOR RADIO FREQUENCY ENERGY TRANSMISSION IN AN IMPERFORATE COMPOSITE STRUCTURE

[75] Inventor: Gregory W. Hughes, Fort Worth, Tex.

[73] Assignee: Lockheed Corporation, Fort Worth, Tex.

[21] Appl. No.: 815,129

[22] Filed: Dec. 27, 1991

[51] Int. Cl.⁵ .............................................. B32B 31/00
[52] U.S. Cl. .................... 156/281; 156/307.4; 156/307.7; 244/119; 244/129.1; 333/24.3; 333/230; 343/705; 343/850; 428/247
[58] Field of Search ............ 156/307.7, 281, 307.4; 428/247; 343/705, 850; 333/24 C, 230; 244/129.1, 119

[56] References Cited

U.S. PATENT DOCUMENTS

| | | | |
|---|---|---|---|
| 3,098,230 | 7/1963 | Nickerson et al. | 343/850 |
| 3,329,957 | 7/1967 | Hoynes | 343/850 |
| 3,987,230 | 10/1976 | Gaku et al. | 156/307.4 |

FOREIGN PATENT DOCUMENTS 827124  2/1960  United Kingdom ................ 333/230

*Primary Examiner*—John J. Gallagher
*Attorney, Agent, or Firm*—Andrew J. Dillon

[57] ABSTRACT

A method and system for controlling the transmission of radio frequency energy through an imperforate multi-layer fiber and resin composite structure. Multiple segments of conductive mesh are embedded between layers of fiber and resin in at least partially overlapping positions. Apertures within the conductive mesh are limited to diameters substantially smaller than the wavelengths of the radio frequency energy utilized; however, the apertures are large enough to permit resin to flow into those apertures during the cure process, thereby limiting the possibility of delamination during loading of the resultant composite structure. By utilizing nonconductive materials, such as glass fibers and a resin material having an appropriate dielectric constant, it is possible to create a radio frequency energy guide or capacitive structure which permits the controlled transmission of radio frequency energy through an imperforate composite structure. By utilizing overlapping segments of conductive mesh, each having a large aperture therein, it is also possible to create an electrically resonant cavity within an imperforate multi-layer fiber and resin composite structure without requiring apertures or discontinuities which might weaken the resultant structure.

10 Claims, 2 Drawing Sheets

METHOD AND SYSTEM FOR RADIO FREQUENCY ENERGY TRANSMISSION IN AN IMPERFORATE COMPOSITE STRUCTURE

BACKGROUND OF THE INVENTION

1. Field of the Invention

The present invention relates in general to improvements in composite structures and in particular to methods and systems for controlling the transmission of radio frequency energy through composite structures. Still more particularly, the present invention relates to methods and systems for controlling the transmission of electrical energy through imperforate multi-layer fiber and resin composite structures without requiring apertures or discontinuities which might weaken the resultant structure.

2. Description of the Prior Art

Composite structures are increasingly utilized in modern aircraft, automobiles, pleasure craft and other applications in which high strength to weight ratios are desired or necessary. Complex air frame structures may be created having substantial strength in a predetermined axis by "laying up" multi-layer composite structures comprised of multiple layers of fibers, usually cloth or tape and selected resins which are thereafter cured utilizing heat and/or pressure. By aligning the axes of the fibers with the direction of the expected forces and stresses, a wide variety of lightweight, high strength structures are provided.

One problem which exists in the utilization of composite structures for aircraft is the necessity of predictably penetrating the composite structure with radio frequency energy for communications, navigation, radar, and electronic counter measure purposes. Heretofore the conduction of alternating currents through composite structural members has required apertures or other physical discontinuities within a composite structure to permit the penetration of electrical conductors. Composite structures which include such penetrations typically require local reinforcement to maintain structural strength, which adds to the cost, complexity and weight of the resultant structure. Attempts at radio frequency transmission through imperforate composite structures have been dramatically affected by the electrical characteristics of the composite material and the surrounding structures, and are thus not entirely predictable.

Thus, it should be apparent that a need exists for a method and system which permits the controlled transmission of radio frequency energy through an imperforate composite structure in a predictable and reliable manner.

SUMMARY OF THE INVENTION

It is therefore one object of the present invention to provide an improved composite structure.

It is another object of the present invention to provide an improved method and system for controlling the transmission of radio frequency energy through a composite structure.

It is yet another object of the present invention to provide an improved method and system for controlling the transmission of electrical energy through an imperforate multi-layer fiber and resin composite structure without requiring apertures or discontinuities.

The foregoing objects are achieved as is now described. Multiple segments of conductive mesh are embedded between layers of fiber and resin in at least partially overlapping positions. Apertures within the conductive mesh are limited to diameters substantially smaller than the wavelengths of the radio frequency energy utilized; however, the apertures are large enough to permit resin to flow into those apertures during the cure process, thereby limiting the possibility of delamination during loading of the resultant composite structure. By utilizing nonconductive materials, such as glass fibers and a resin material having an appropriate dielectric constant, it is possible to create a radio frequency energy guide or capacitive structure which permits the controlled transmission of radio frequency energy through an imperforate composite structure. By utilizing overlapping segments of conductive mesh, each having a large aperture therein, it is also possible to create an electrically resonant cavity within an imperforate multi-layer fiber and resin composite structure without requiring apertures or discontinuities which might weaken the resultant structure.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
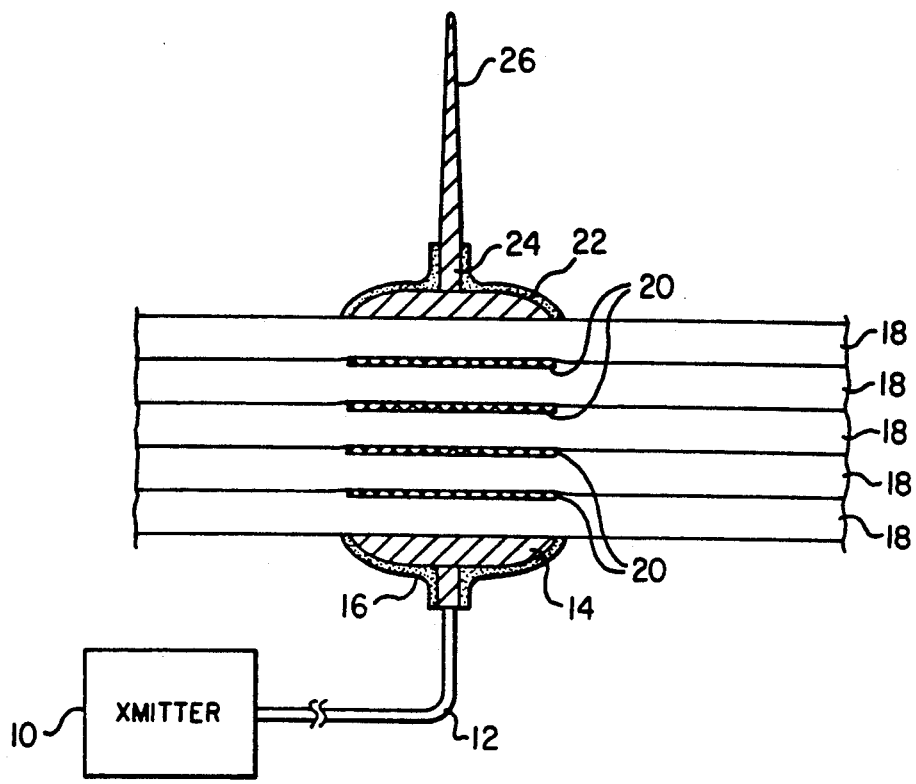
FIG. 1 is a partially schematic sectional view of a capacitive coupling for radio frequency energy through an imperforate multi-layer composite structure which is constructed in accordance with the method and system of the present invention.

With reference now to the figures and in particular with reference to FIG. 1, there is depicted a partially schematic sectional view of a capacitive coupling for radio frequency energy through an imperforate multi-layer composite structure which has been constructed in accordance with the method and system of the present invention. As illustrated, the capacitive coupling depicted within FIG. 1 is utilized for the purpose of conducting radio frequency energy from a transmitter located on one side of an imperforate multi-layer composite structure 10 to an antenna 26 located on a second side of the imperforate multi-layer composite structure. This is accomplished without requiring apertures or discontinuities within the multi-layer composite structure by embedding a plurality of noncontiguous conductive mesh segments 20 in an overlapping manner between alternate fiber and resin layers 18.

In the depicted embodiment of the present invention each conductive mesh segment 20 is provided utilizing a conductive screen fiber manufactured of copper mesh which is commonly utilized for radio frequency insulation or lighting strike dispersal purposes. Those skilled in the art will appreciate that conductive fabric or expanded metal may also be utilized; however, the thickness of the material and the number of apertures therein is generally constrained by both the desired thickness of the resultant composite structure and the electromagnetic frequencies involved.

Specifically, experimentation has shown that apertures within noncontiguous conductive mesh segments 20 are preferably substantially smaller than the wavelengths of the electromagnetic frequencies involved. Specifically, aperture diameters of less than one tenth of the wavelength of the electromagnetic frequencies involved have been shown to produce an effective capacitive plate action in the capacitive coupling depicted within FIG. 1.

Additionally, the apertures within noncontiguous conductive mesh segments 20 should be of a sufficient size such that resin utilized to construct the multi-layer fiber and resin structure depicted will flow into the apertures during the cure process, substantially decreasing the possibility of delamination during stress on the resultant composite structure. In the depicted embodiment of the present invention, nonconductive fibers, such as glass fibers, cloth or tape and various dielectric resins may be utilized. One example of such a resin is cyanate ester resin; however, those skilled in the art will appreciate that other resins exist which have a similar dielectric constant.

By embedding overlapping conductive mesh segments 20 between alternate fiber and resin layers 18 within the imperforate composite structure depicted, those skilled in the art will appreciate that a capacitor having a desired amount of capacitance may be created. As is well known in the electrical art, the capacitance in farads for a given capacitor is directly proportional to the area of parallel plates and inversely proportional to the distance between those plates. Further, a constant relating to the permittivity of free space and the relative permittivity of the uniform isotropic dielectric material between the plates will also affect the amount of capacitance created. By varying both the spacing between alternate layers and the dielectric constant of the resin utilized, those skilled in the art will appreciate that the capacitive coupling depicted within FIG. 1 may be adjusted to accommodate the most efficient transmission of high frequency electromagnetic electrical energy from transmitter 10 to antenna 26.

The transmission of electrical energy through the imperforate composite structure depicted is preferably accomplished by coupling high frequency electromagnetic energy from transmitter 10 to a conductive plate 14 via a cable 12. Insulation 16 is provided surrounding conductive plate 14; however, such insulation is optional and may not be required. On the upper surface of the multi-layer imperforate composite structure a second conductive plate 24 is utilized with an associated insulative cover 22 to couple radio frequency energy which has been capacitively coupled from conductive plate 14 to antenna 26. Upon reference to FIG. 1, those skilled in the art will appreciate that the method and system of the present invention provides a manner in which high frequency electromagnetic energy may be controllably transmitted through an imperforate multi-layer composite structure without requiring apertures or discontinuities in the fibers therein.

Figure 2:
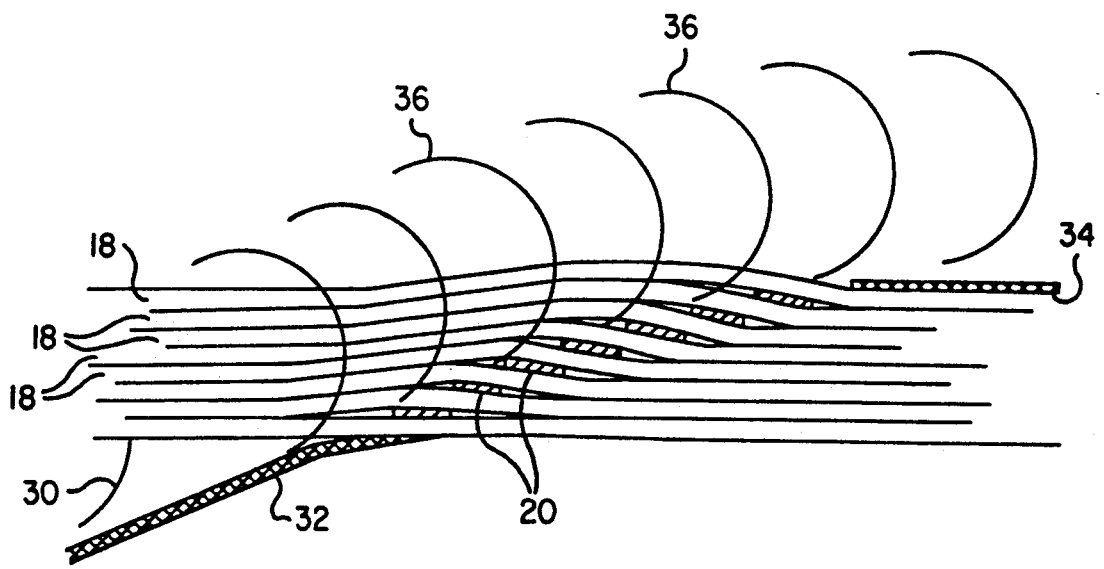
FIG. 2 is a sectional view of a radio frequency energy guide provided within an imperforate multi-layer composite structure utilizing the method and system of the present invention.

Referring now to FIG. 2, there is depicted a sectional view of a radio frequency energy guide which has been provided within an imperforate multi-layer composite structure utilizing the method and system of the present invention. As above, the radio frequency energy guide provided comprises a plurality of conductive mesh segments 20 which are embedded within multiple fiber and resin layers 18 in a multi-layer composite structure. By partially overlapping each conductive mesh segment 20 with the conductive mesh segment 20 above or below that segment, the internal ground plane 32, which is associated with antenna 30, may be effectively extended through the imperforate multi-layer composite structure to an external ground plane 34, in the manner depicted. Those skilled in the electrical art will appreciate that by providing conductive mesh segments 20 between multiple fiber and resin layers 18 in the manner depicted, high frequency electromagnetic energy, depicted schematically at reference numeral 36, may be effectively "steered" through the resultant multi-layer composite structure and directed utilizing external ground plane 34, in the manner illustrated.

Figure 3:
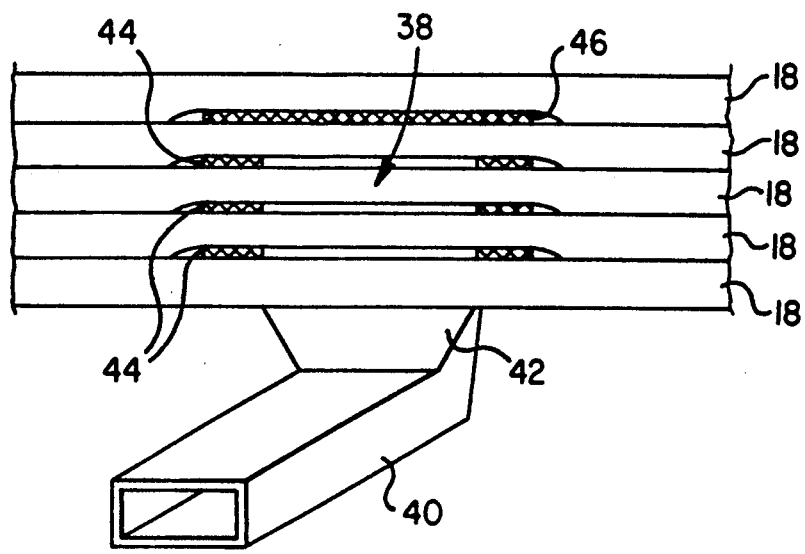
FIG. 3 is a sectional view of an electrically resonant cavity provided within an imperforate multi-layer composite structure utilizing the method and system of the present invention.

With reference to FIG. 3, there is depicted a sectional view of an electrically resonant cavity which may be provided within an imperforate multi-layer composite structure utilizing the teachings of the present invention. As above, the embodiment depicted within FIG. 3 is constructed by utilizing a plurality of conductive mesh segments 44 which are embedded between fiber and resin layers 18 of the multi-layer composite structure depicted. As in each embodiment of the present invention, this is accomplished during assembly of the multi-layer composite fiber and resin structure and the resultant structure is then heat and/or pressure cured in a manner such that the resin utilized in construction will flow into the apertures within the conductive mesh segments, thereby minimizing the possibility of delamination during loading of the resultant structure.

Figure 5:
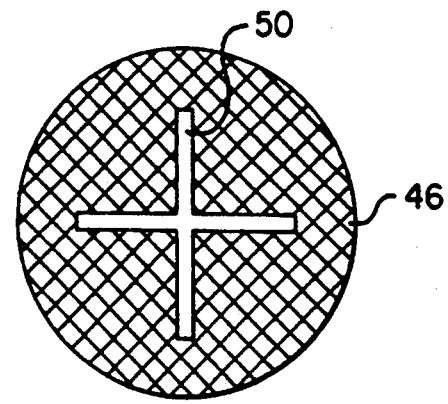
FIG. 5 is a plan view of a cruciform aperture segment which may be utilized in conjunction with the electrically resonant cavity depicted within FIG. 3.

By utilizing ring-shaped conductive mesh segments 44, it may be seen that a resonant cavity 38 may be defined within the multi-layer composite structure depicted within FIG. 3, having internal dimensions which are defined by a large aperture within ring-shaped conductive mesh segment 44. Additionally, a cruciform aperture may be provided within conductive mesh segment 46 to polarize the output of resonant cavity 38 in a manner which will be explained in greater detail with reference to FIG. 5.

After constructing a resonant cavity in the manner depicted within FIG. 3, high frequency electromagnetic energy may be applied to a point underlying electrically resonant cavity 38 utilizing a well known waveguide 40 and feed horn 42. By applying high frequency electromagnetic energy to a point below the circular aperture within each ring-shaped conductive mesh segment 44, electrical energy within the multi-layer composite structure will be constrained to the electrically resonant cavity thus provided and may be output via the cruciform aperture of conductive mesh segment 46.

Figure 4:
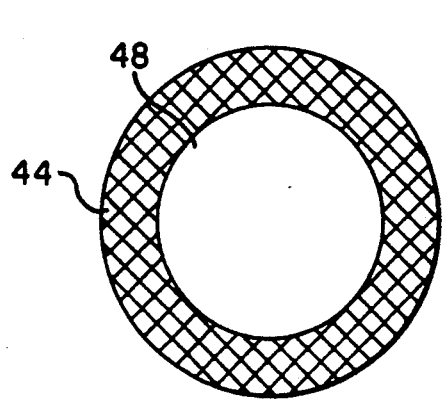
FIG. 4 is a plan view of a conductive mesh segment which may be utilized to construct the electrically resonant cavity depicted within FIG. 3.

Referring now to FIG. 4, there is depicted a plan view of a conductive mesh segment 44 which may be utilized to create the electrically resonant cavity 38 depicted within FIG. 3. As illustrated, each ring-shaped conductive mesh segment 44 includes a large aperture 48 which defines the dimensions of resonant cavity 38. Of course, those skilled in the art will appreciate that a square or rectangular shaped conductive mesh segment may also be utilized having a square or rectangular shaped aperture therein, as a simple matter of design choice. Similarly, conductive mesh segment 46 includes a cruciform aperture 50 which may be utilized to polarize the output of a high frequency electromagnetic transmitter associated with electrically resonant cavity 38 in manner well known to those skilled in the art.

Upon reference to the foregoing those skilled in the art will appreciate that the Applicant herein has provided a method and system whereby high frequency electromagnetic energy may be controllably transmitted through an imperforate multi-layer composite structure by the selective embedding of conductive mesh segments therein. As utilized herein, the phrase "conductive mesh" shall be deemed to include conductive fabric or expanded metal having a regular or irregular pattern of apertures therein which are constrained by the requirement that the apertures are of sufficient size to permit resin to penetrate the conductive material during curing of the resultant composite structure while being sufficiently small so as to not diminish the transmissive capabilities of the conductive material for selected electromagnetic wavelengths. By utilizing a dielectric resin, such as cyanate ester resin, or other similar dielectric resins, the accurate and efficient transmission of radio frequency energy through an imperforate composite structure may be accomplished without requiring penetrations or discontinuities in the fibers within the structure, thereby maximizing the strength of a resultant composite structure.

While the invention has been shown in only one of its forms, it is not thus limited but is susceptible to various changes and modifications without departing from the spirit thereof.

What is claimed is:

1. A method of controllably conducting electrical energy having a selected wavelength through an imperforate multi-layer fiber and resin composite structure, said method comprising the steps of:

selectively embedding multiple at least partially overlapping noncontiguous segments of conductive mesh between adjacent layers of fiber and resin within said composite structure during assembly thereof such that discontinuities in said fiber are avoided, said conductive mesh including a plurality of apertures which are substantially smaller than said selected wavelength of said electrical energy and of sufficient size to permit said resin to flow into said plurality of apertures during a curing process;

curing said composite structure; and controlling the transmission of electrical energy from one side of said imperforate multi-layer fiber and resin composite structure to a second side of said imperforate multi-layer fiber and resin composite structure utilizing said multiple segments of conductive mesh without penetrating said imperforate multi-layer fiber and resin composite structure and without introducing discontinuities in said fiber therein.

2. The method of controllably conducting electrical energy through an imperforate multi-layer fiber and resin composite structure according to claim 1, further including the step of assembling said composite structure utilizing a dielectric resin.

3. The method of controllably conducting electrical energy through an imperforate multi-layer fiber and resin composite structure according to claim 2, wherein said dielectric resin comprises cyanate ester resin.

4. The method of controllably conducting electrical energy through an imperforate multi-layer fiber and resin composite structure according to claim 1, wherein said step of curing said composite structure comprises the step of heat and pressure curing said composite structure.

5. The method of controllably conducting electrical energy through an imperforate multi-layer fiber and resin composite structure according to claim 1, wherein said step of controlling the transmission of electrical energy through said imperforate multi-layer fiber and resin composite structure comprises the step of capacitively coupling electrical energy through said imperforate multi-layer fiber and resin composite structure utilizing said multiple substantially overlapping non contiguous segments of conductive mesh.

6. A method of creating an electrically resonant cavity within an imperforate multi-layer fiber and resin composite structure for electrical energy having a selected wavelength said method comprising the steps of:

selectively embedding multiple overlapping noncontiguous segments of conductive mesh between layers of fiber and resin within said composite structure during assembly thereof, said conductive mesh including a plurality of apertures which are substantially smaller than said selected wavelength of said electrical energy and of sufficient size to permit said resin to flow into said plurality of apertures during a curing process, and each of said multiple overlapping segments of conductive mesh having a large aperture therein defining internal dimensions of said resonant cavity;

curing said composite structure; and selectively applying electrical energy having said selected wavelength to said imperforate multi-layer fiber and resin composite structure at a point underlying said large aperture within each of said multiple overlapping segments of conductive mesh wherein said electrical energy will resonate within said resonant cavity.

7. The method of creating an electrically resonant cavity within an imperforate multi-layer fiber and resin composite structure according to claim 6, wherein said step of embedding multiple overlapping segments of conductive mesh, each having a large aperture therein defining internal dimensions of said resonant cavity comprises embedding multiple overlapping circular segments of conductive mesh, each having a large circular aperture therein.

8. The method of creating an electrically resonant cavity within an imperforate multi-layer fiber and resin composite structure according to claim 6, further including the step of embedding a segment of conductive mesh having a cruciform aperture therein within said composite structure overlapping said multiple segments of conductive mesh at a point overlying said large aperture within each of said multiple overlapping segments of conductive mesh.

9. The method of creating an electrically resonant cavity within an imperforate multi-layer fiber and resin composite structure according to claim 6, further including the step of assembling said composite structure utilizing a dielectric resin.

10. The method of creating an electrically resonant cavity within an imperforate multi-layer fiber and resin composite structure according to claim 6, wherein said step of curing said composite structure comprises the step of heat and pressure curing said composite structure.

* * * * *